(12) United States Patent
Mubarak

(10) Patent No.: US 9,745,782 B2
(45) Date of Patent: Aug. 29, 2017

(54) SECURE SEALING DEVICE AND METHOD

(71) Applicant: NFIDENT DWC-LLC, Dubai (AE)

(72) Inventor: Sameer Mubarak, Amman (JO)

(73) Assignee: NFIDENT DWC-LLC, Dubai (AE)

( * ) Notice: Subject to any disclaimer, the term of this patent is extended or adjusted under 35 U.S.C. 154(b) by 0 days.

(21) Appl. No.: 14/652,796

(22) PCT Filed: Dec. 17, 2013

(86) PCT No.: PCT/IB2013/002787
§ 371 (c)(1),
(2) Date: Jun. 17, 2015

(87) PCT Pub. No.: WO2014/096928
PCT Pub. Date: Jun. 26, 2014

(65) Prior Publication Data
US 2015/0337564 A1 Nov. 26, 2015

(30) Foreign Application Priority Data

Dec. 17, 2012 (EP) ..................................... 12197521

(51) Int. Cl.
*E05B 73/00* (2006.01)
*G08B 21/18* (2006.01)
(Continued)

(52) U.S. Cl.
CPC .... *E05B 73/0005* (2013.01); *G06K 19/07767* (2013.01); *G06K 19/07798* (2013.01);
(Continued)

(58) Field of Classification Search
CPC .. G06Q 10/00; G06K 7/10316; G06K 7/0008; G06K 19/0723; E05B 17/00; E05B 67/383; G07C 1/32
(Continued)

(56) References Cited

U.S. PATENT DOCUMENTS 6,265,973 B1 7/2001 Brammall et al.
2005/0231365 A1 10/2005 Tester et al.
(Continued)

FOREIGN PATENT DOCUMENTS

CN 101593266 A 12/2009
CN 102216969 A 10/2011
(Continued)

OTHER PUBLICATIONS

The First Office Action dated Mar. 27, 2017, Chinese Application No. 2013800729890, pp. 1-18 (including English translation).

*Primary Examiner* — George Bugg
*Assistant Examiner* — Munear Akki
(74) *Attorney, Agent, or Firm* — MH2 Technology Law Group, LLP

(57) ABSTRACT

The present invention concerns a secure sealing device 101 comprising at least a closure element 102 with an electrically conductive path 120, and a locking body 103 comprising an electric circuit with a data carrier and a radiofrequency transceiver with a predetermined working wavelength. Said locking body 103 is configured be locked to at least one free end 102a of said closure element 102 to attach the locking body 103 to an object to be sealed. The electrically conductive path 120 of the closure element 102 has a length which is substantially equal to X or $\frac{1}{2}^X$ times half said predetermined working wavelength of the radiofrequency transceiver, thus enhancing the range of the radiofrequency transceiver by inductive coupling.

15 Claims, 7 Drawing Sheets

(51) Int. Cl.
*G06K 19/077* (2006.01)
*G09F 3/03* (2006.01)
(52) U.S. Cl.
CPC ........... *G08B 21/18* (2013.01); *G09F 3/0335* (2013.01); *G09F 3/0347* (2013.01); *G09F 3/0358* (2013.01); *Y10T 70/413* (2015.04)
(58) Field of Classification Search
USPC ...... 340/542, 10.1, 10.2, 10.3, 10.31, 10.32, 340/10.33, 10.34, 10.4, 10.41, 10.42, 340/10.5, 10.51, 10.52, 10.6; 70/14, 434
See application file for complete search history.

(56) References Cited

U.S. PATENT DOCUMENTS

| | | |
|---|---|---|
| 2006/0087431 A1 | 4/2006 | Shieh |
| 2006/0145868 A1 | 7/2006 | Chen et al. |
| 2007/0103310 A1 | 5/2007 | Hopman et al. |
| 2007/0139196 A1 | 6/2007 | Rietzler |
| 2007/0222232 A1 | 9/2007 | Held |
| 2009/0289795 A1 | 11/2009 | Yamagajo et al. |
| 2011/0279236 A1 | 11/2011 | Azzalin et al. |
| 2011/0285509 A1* | 11/2011 | Greene ............... G06Q 10/00 340/10.1 |
| 2012/0326940 A1 | 12/2012 | Lee et al. |
| 2013/0255337 A1* | 10/2013 | Mullis ................. E05B 17/00 70/434 |
| 2015/0235063 A1* | 8/2015 | Loussert ............ G06K 7/10316 340/10.1 |

FOREIGN PATENT DOCUMENTS

| | | | |
|---|---|---|---|
| CN | 102856635 A | 1/2013 | |
| DK | EP 2717242 A1 * | 4/2014 | ........... G09F 3/0335 |
| EP | 2189964 A1 | 11/2008 | |
| EP | 2717242 A1 | 4/2014 | |

* cited by examiner

FIG. 6
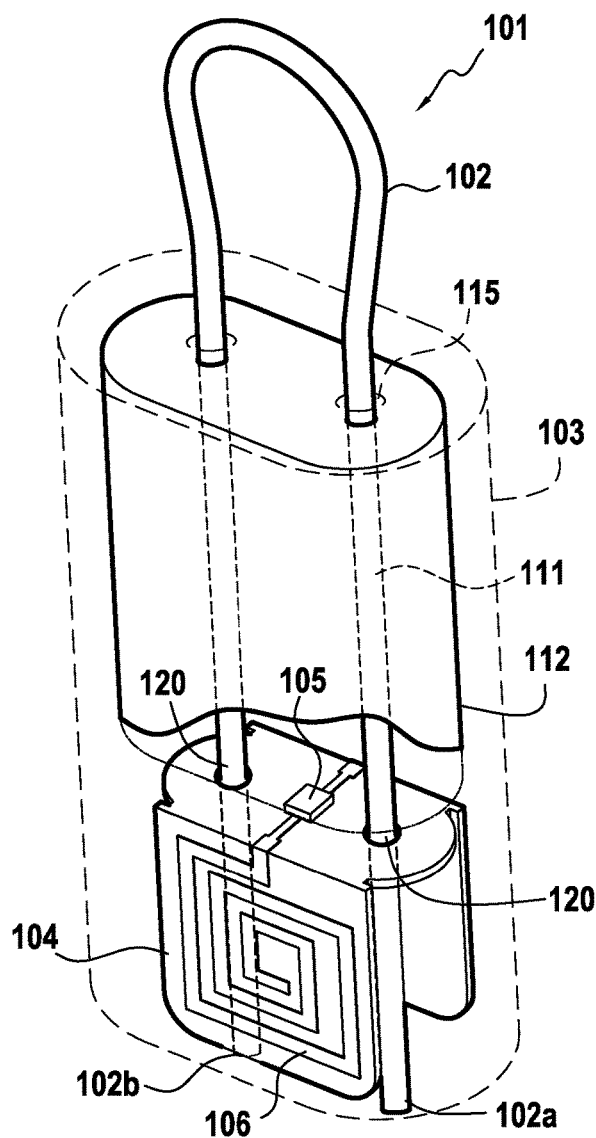
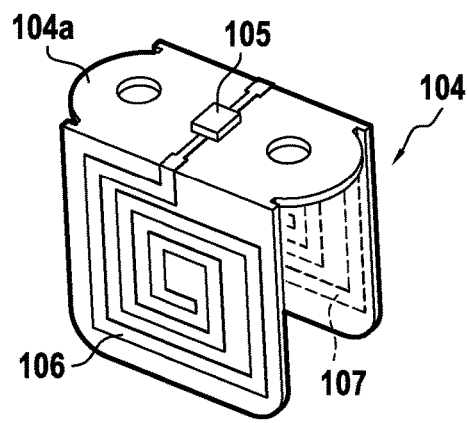
FIG. 7

FIG.8B
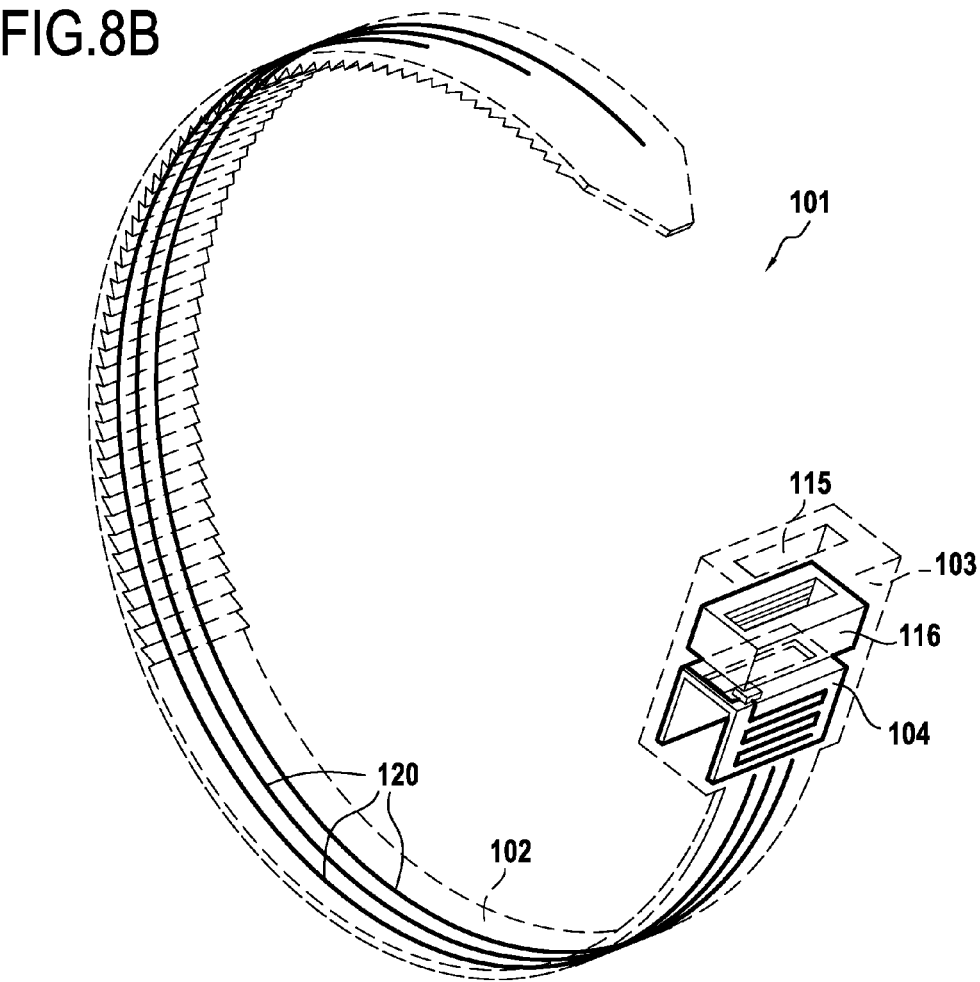
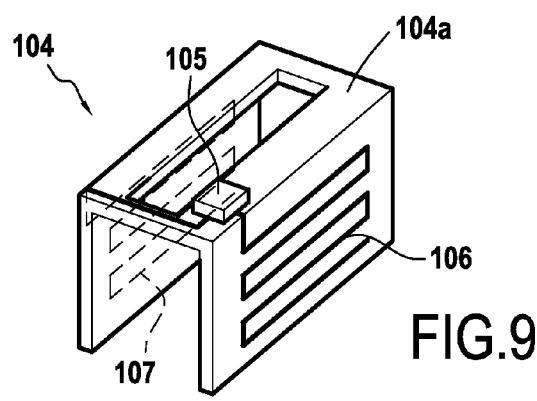
FIG.9

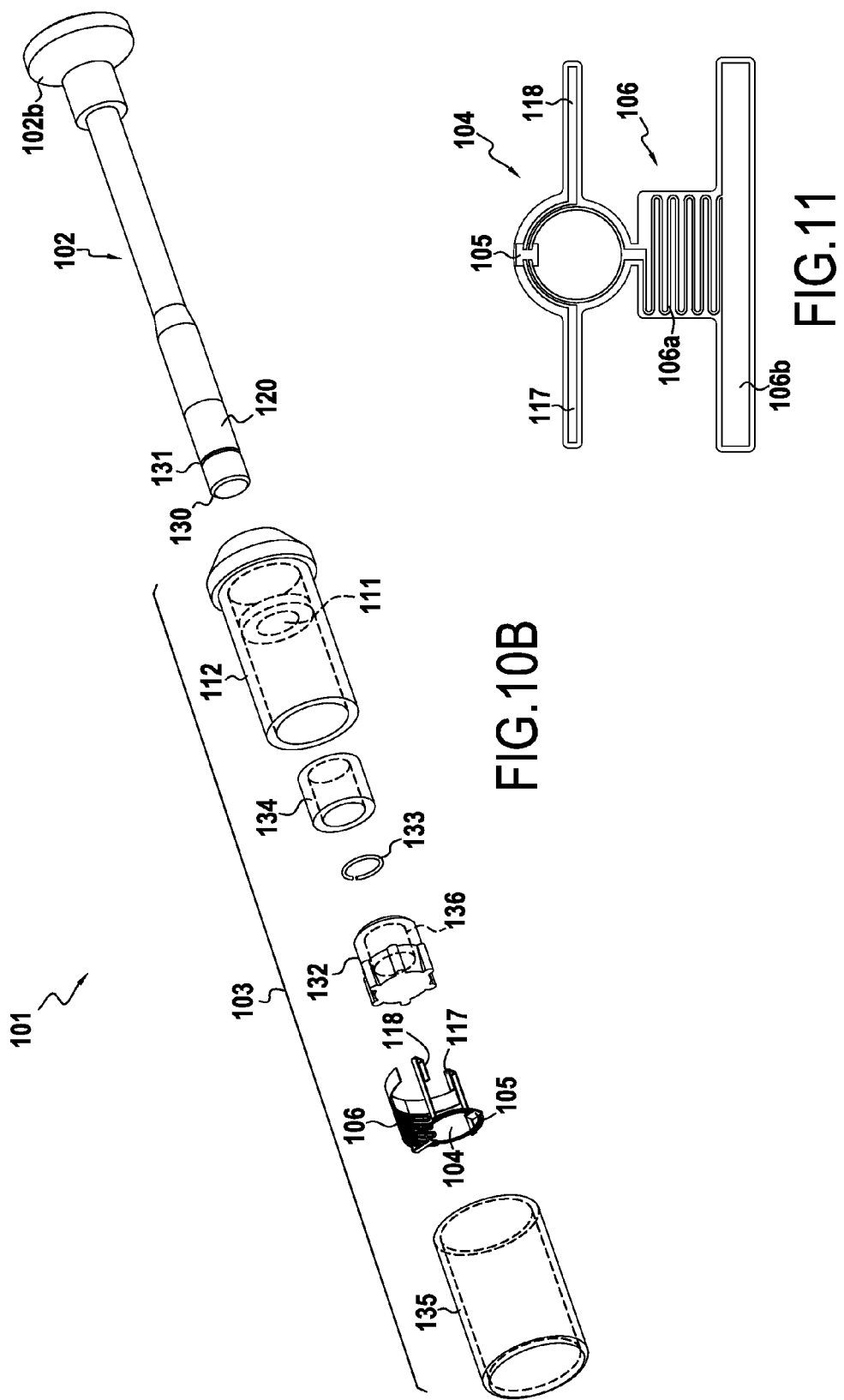

SECURE SEALING DEVICE AND METHOD

TECHNICAL FIELD

The invention relates to the domain of secure sealing devices and methods, in particular those involving transceivers.

BACKGROUND

It has been a long-standing human necessity to seal access to certain assets, in particular assets in transit. In order to prevent smuggling, for instance, customs authorities routinely seal in-transit cargo vehicles and shipping containers with tagged sealing devices. Such tagged sealing devices may also be used by cargo owners or logistics providers to protect cargo against theft or other unauthorized tampering. While the physical protection offered by such tagged sealing devices may be limited, their main purpose is to clearly reveal whether they have been breached and the cargo potentially accessed. By regularly checking the tagged sealing devices, the cargo can be tracked and, if the sealing device has been breached, it is possible to identify the transit segment during which the breach has taken place. Such tagged sealing devices can thus be very efficient deterrents against unauthorized access, diversion and/or tampering of assets in transit.

Different types of tagged sealing devices are known to the skilled person. In one of its simplest forms, such a tagged sealing device may be a plastic tag with a ratchet strap. More elaborate tagged sealing devices take the form of a metal lock with a wire strap, a tagged metal strip seal, or a tagged bolt seal. To prevent false alerts, it is also important to prevent accidental breaches of such tagged sealing devices. To this purpose, the International Standard Organization (ISO) has issued the ISO 17712 standard for Tensile, Shear, Bend and Impact Resistance certification for sealing devices.

One inconvenience of most such tagged sealing devices is that checking and identifying them requires close visual inspection of the tags. When large numbers of containers have to be tracked, for instance in important customs checkpoints or transshipment facilities, this can be extremely tedious and time-consuming. Moreover, agents visually inspecting large numbers of seals may easily overlook individual seal breaches.

For this reason, several different types of secure sealing devices have been proposed incorporating radiofrequency identification (RFID) technology. Such RFID devices incorporate a radiofrequency transceiver for wirelessly communicating identification data to a remote reader. Moreover, the radiofrequency transceiver may also transmit a specific signal if the sealing device has been breached. For instance US Patent Application Publications US 2005/0231365 A1 and US 2007/0103310 A1 and U.S. Pat. No. 6,265,973 B1 each disclose a secure sealing device with an electronic circuit configured to transmit a specific signal in case of breach. However, the secure sealing devices disclosed in these documents require active radiofrequency transceivers, and thus a power supply. Ensuring such a power supply increases the complexity and cost of these sealing devices and reduces their reliability. The range at which such secure sealing devices can respond to a remote reader depends on this power supply. Increasing this range thus normally involves a trade-off in terms of increasing cost and decreasing reliability.

Alternatively, secure sealing devices have also been proposed that only require a passive radiofrequency transceiver, that is, a transceiver that can be powered solely by the energy of incoming radio signals. Such devices have been disclosed in US Patent Application Publications US 2006/0145868 A1, US 2006/0087431 A1 and US 2007/0139196 A1. In these secure sealing devices, an electrically conductive path connecting the radiofrequency transceiver and antenna is broken if the seal is breached. Such a breach can therefore be easily detected. However, one drawback of these secure sealing devices is that the range at which they respond to a remote reader is normally quite limited.

SUMMARY

A first object of the disclosure is that of providing a simple and tamper-safe secure sealing device, and in particular a secure sealing device comprising at least a closure element with an electrically conductive path, and a locking body comprising an electric circuit with a data carrier and a radiofrequency transceiver with a predetermined working wavelength, said locking body being also configured be locked to at least one free end of said closure element to attach the locking body to an object to be sealed, wherein the communication range of the radiofrequency transceiver with a remote reader is significantly increased without requiring an increased internal or external power supply.

For this purpose, in at least one illustrative embodiment, the electrically conductive path of the closure element has a length which is substantially equal to X or $\frac{1}{2}^X$ times half said predetermined working wavelength of the radiofrequency transceiver, wherein X is a whole number. With such lengths, this electrically conductive core can work as a supplemental antenna at said working wavelength of the closure element, significantly increasing the range of the radiofrequency transceiver by inductive coupling, even without being physically connected to it. Within the present length, "substantially equal" is understood as allowing a variation of, for example, ±10%.

In at least one embodiment, the locking body may be configured to lock together a first and a second end of said closure element to attach the locking body to the object to be sealed. This can facilitate, in particular, the use of a flexible closure element, such as a cord or strap, allowing its use in a broad range of situations. Alternatively, however, the locking body may be configured to be locked to only one end of the closure element, as in a bolt seal.

The inductive coupling of the electrically conductive core of the closure element with the radiofrequency transceiver can be enhanced if the radiofrequency transceiver comprises at least a first planar antenna oriented in a first plane, and said locking body is configured to lock together said first and second ends of the closure element oriented in a plane substantially parallel to said first plane. The electrically conductive path of the closure element and the first planar antenna can thus be oriented along substantially parallel planes, which facilitates their inductive coupling. For better coverage to each side of the secure sealing device, the radiofrequency transceiver may comprise at least a second planar antenna oriented substantially parallel to the first planar antenna. "Substantially parallel" is understood as being functionally equivalent to a parallel orientation, although there may be a slight divergence, for instance of 5° or 10°.

A second object of the present disclosure is to provide a secure sealing device which is tamper-proof, in particular against a breach of the closure element. For that purpose, said electric circuit may comprise first and second electric terminals configured to be connected through the electrically conductive path of the closure element when the first and second ends of the closure element are locked together by the locking body, so that a breach of the closure element will interrupt this connection between the first and second electric terminals, interruption that may be easily detected by the electric circuit. In particular, the electric circuit may be configured to automatically store within said data carrier whether a connection between said first and second electric terminals has been interrupted. With this further anti-tampering feature, it will be possible to identify a breached seal even if the connection has been subsequently reestablished.

It is a third object of the present disclosure to provide a particularly compact secure sealing device. For this purpose, the electric circuit may be formed onto a substrate comprising at least a first segment, supporting at least a first planar antenna of the radiofrequency transceiver, extending in a first plane, and a second segment, supporting at least said first and second terminals and extending in a second plane at an angle, for example a substantially straight angle, with respect to the first plane. For better coverage to either side of the secure sealing device, the substrate may further include a third segment, supporting at least a second planar antenna of the radiofrequency transceiver, and extending substantially parallel to the first segment. To protect the electric circuit against accidental damage or tampering, the electric circuit may be encased within a dielectric material. Within the present disclosure, "substantially straight angle" is understood as an angle which, for its present practical purpose, is functionally equivalent to a straight angle, although it may differ slightly from 90°, for instance by 5° or 10°. It must be noted that these features of the electric circuit can be used even in isolation of other features of the disclosure, and at least some of their advantages enjoyed even in an analogous secure sealing device in which the closure element does not present an electrically conductive path, or its electrically conductive path is of a length which is not substantially equal to a multiple of half a working wavelength of the radiofrequency transceiver.

In order to physically impede an intentional or accidental seal breach, said locking body may comprise at least a first opening for insertion of a first free end of said closure element into said locking body, and a first holding mechanism for preventing removal of said first free end from said first opening once inserted.

Analogously, the locking body may also comprise a second opening for insertion of a second free end of said closure element into said locking body, and a second holding mechanism for preventing removal of said second free end from said second opening once inserted. Alternatively, however, the second end of the closure element may be solid with the locking body, so that it does not require to be inserted or locked into it, or it may present an enlarged cross-section, as in a bolt seal.

To facilitate the use of the secure sealing device, the closure element may be flexible. Alternatively, however, it may be rigid, as in a padlock or bolt seal.

In order to increase the versatility of the secure sealing device, and in particular to adapt it to a plurality of different standards, its radiofrequency transceiver may have a plurality of predetermined working wavelengths, and its closure element a plurality of electrically conductive paths of different lengths, each one substantially equal to a multiple of one half of one of said plurality of predetermined working wavelengths of the radiofrequency transceiver.

It is a further object of the present disclosure to provide a method for checking the integrity of such a secure sealing device. For this purpose, an external reader, located at a predetermined range from said radiofrequency transceiver, may send an interrogation signal, addressed to the radiofrequency transceiver and using said working wavelength, at various different transmission power levels, and issue an alert if it fails to receive a response of the radiofrequency transceiver below a predetermined transmission power threshold of the interrogation signal. This "power sweep" technique allows a fast and easy first remote check of the integrity of the secure sealing device.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of various embodiments in connection with the accompanying drawings, in which:

FIG. 6 is a cutaway perspective view of a secure sealing device according to a third embodiment of the present invention;

FIG. 7 is a perspective view of an RFID inlay of the secure sealing device of FIG. 6;

FIG. 8B is a cutaway perspective view of the secure sealing device of FIG. 8A;

FIG. 9 is a perspective view of an RFID inlay of the secure sealing device of FIGS. 8A and 8B;

FIG. 10B is an exploded perspective view of the secure sealing device of FIG. 10A; and FIG. 11 is a plan view of an RFID inlay of the secure sealing device of FIGS. 10A and 10B.

Figure 1:
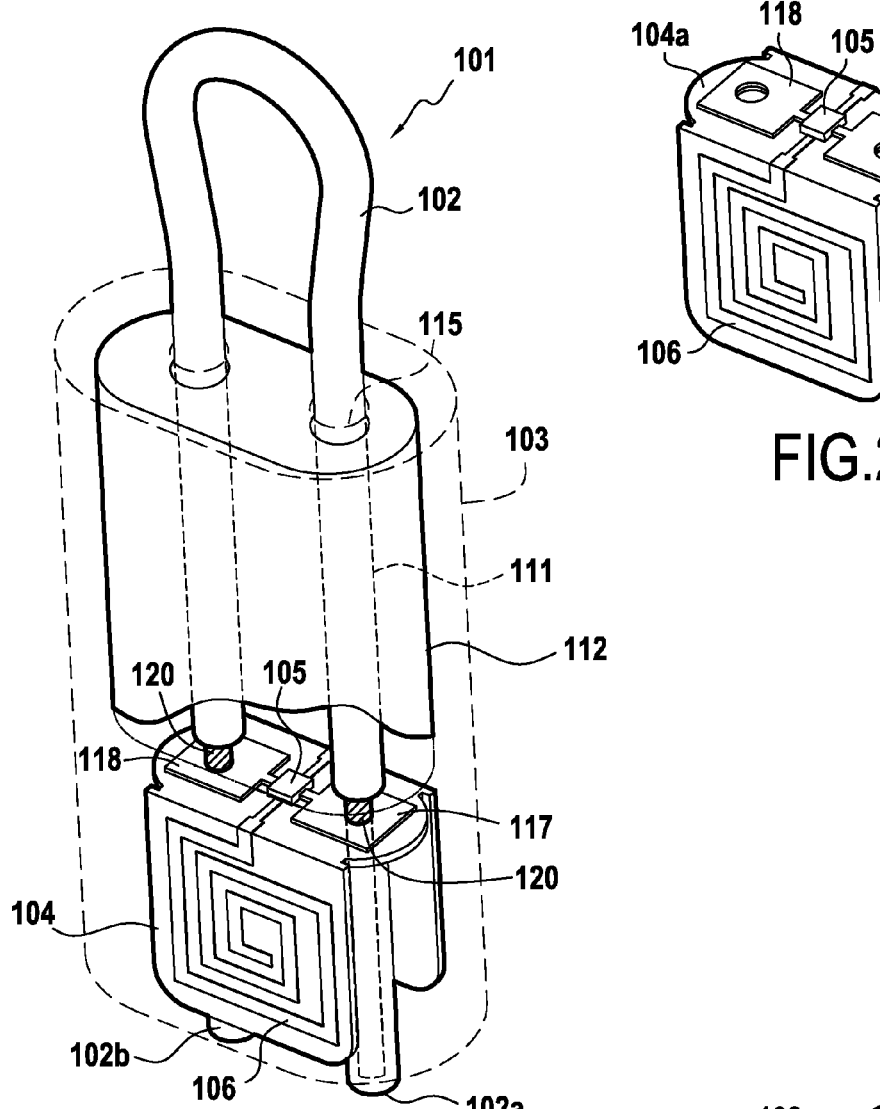
FIG. 1 is a cutaway perspective view of a secure sealing device according to a first embodiment of the present invention.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 3:
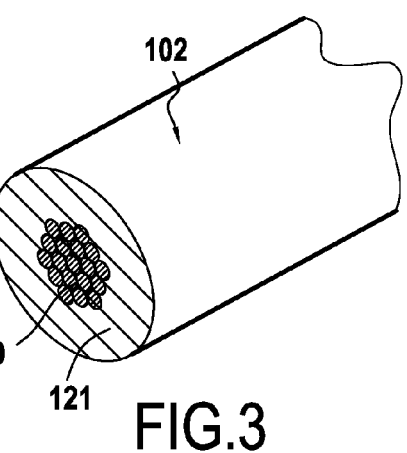
FIG. 3 is a transversal cut view of the closure element of the secure sealing device of FIG. 1.

A secure sealing device 101 according to a first embodiment of the present invention is illustrated in FIG. 1. This secure sealing device 101 comprises a closure element 102 and a locking body 103. In the illustrated embodiment, the closure element 102 is an elongated, flexible cord with an electrically conductive path 120, such as can be produced by winding together a core of several strands of electrically conductive filaments, covered by an electrically insulating sheath 121. As illustrated in FIG. 3, the closure element 102 has a round cross-section, although other cross-sections, for example polygonal cross-sections, can alternatively be considered. First and a second channels 111 each traverse the locking body 103, including a locking core 112 with respective holding mechanisms for locking each end 102a, 102b of the closure element 102.

For visual identification of the secure sealing device 101, the locking body 103 can present visible markings (not shown), in the form, for instance, of alphanumeric codes, bar codes, or other human- or machine-readable codes, printed or embossed, or of other authentication or identification markings, such as, for instance, holograms.

Figure 2:
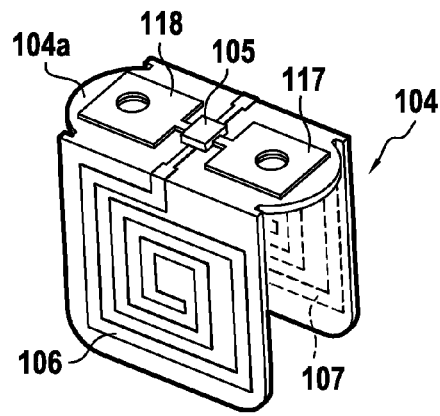
FIG. 2 is a perspective view of an RFID inlay of the secure sealing device of FIG. 1.

However, as illustrated in FIGS. 1 and 2, the secure sealing device 101 also comprises, embedded within the locking body 103, an RFID inlay 104 carrying an electric circuit comprising a data carrier, a transceiver, first and second antennas 106,107 for the transceiver, and first and second electric terminals 117,118. In this first embodiment, the data carrier and transceiver are integrated in an RFID integrated circuit 105, compliant with ISO/IEC 18000 and bonded onto the RFID inlay 104. The working frequencies of this RFID integrated circuit 105 may be, for instance, 2.45 GHz, as specified under ISO/IEC 18000-4, 860-960 MHz, as specified under ISO/IEC 18000-6, and/or 433 MHz, as specified under ISO/IEC 18000-7. The data carrier can be a read-only or a rewritable memory, wherein a rewritable memory could store information received by the radiofrequency transceiver, such as, for instance, itinerary information collected at each reading of the radiofrequency transceiver. The first and second antennas 106, 107 are planar antennas directly connected to the RFID integrated circuit 105 by conductive paths printed onto the substrate of the RFID inlay 104. The length of the conductive path 120 can be substantially equal to a multiple of half a working wavelength of the radiofrequency transceiver, so as to enhance the range of the radiofrequency transceiver by inductive coupling. In the present context, "multiple" is to be understood in the broader, mathematical sense, meaning X times half the working wavelength, wherein X is a whole number equal to or higher than one. For instance, if the working frequency of the radiofrequency transceiver is in the 860-960 MHz band, which corresponds to a wavelength of approximately 0.35 m, the length of the conductive path 120 can be substantially equal to X times 175 mm. At such a length, when receiving or transmitting signals at that working frequency, there is inductive coupling between the planar antenna 106 and this electrically conductive path 120, enhancing the range of the radiofrequency transceiver.

Each one of the first and second electric terminals 117, 118 is also directly connected to the RFID integrated circuit 105 over a conductive path printed onto the substrate of the RFID inlay 104. These first and second electric terminals 117, 118 are shaped as electric contacts around respective holes in the RFID inlay 104, which are aligned with the channels 111 to allow the introduction of both ends 102a, 102b of the closure element 102 through these holes when received in those channels 111. In order to minimize the bulk and size of the secure sealing device 101, the substrate of the RFID inlay 104 is not flat, but n-shaped, wherein the two electric terminals 117, 118 are located on an intermediate segment 104a of this n-shape, which is oriented in a plane substantially perpendicular to the direction of introduction of both ends 102a, 102b of the closure element 102 through the holes in the RFID inlay 104, and the antennas 106,107 are each to one side of this intermediate segment 104a, on each leg of the n-shape. The antennas 106,107 are thus oriented following two parallel planes which are each at a straight angle to that of the intermediate segment 104a. With this configuration, it is possible to have, within a comparatively thin and compact secure sealing device 101, two antennas 106, 107 of considerable size, each one located to one side of the secure sealing device 101 so as to provide a good coverage in both directions. Moreover, since in this embodiment the two ends 102a, 102b of the closure element 102 are substantially aligned with a plane parallel to those of the two planar antennas 106, 107, the inductive coupling between the conductive path 120 of the closure element 102 and the planar antennas 106,107 is enhanced.

The RFID integrated circuit 105 may be passive, that is, powered only by the energy of incoming radiofrequency signals, or it may be connected to a power source, such as a battery or capacitor, possibly contained within the secure sealing device 101. This RFID integrated circuit 105 is also configured so as to detect an electric connection between the two electric terminals 117, 118. If the RFID integrated circuit 105 has a rewritable memory and remains connected to a power source, it may also be configured to register, in the rewritable memory, the event of such an electric connection between the terminals 117, 118 and/or its interruption.

In order to establish an electric connection between these electric terminals 117,118, once the secure sealing element 101 has been closed by inserting both ends 102a,102b of the closure element 102 into the corresponding openings 115 in the locking body 103, sharp edges transverse to the channels 111 within the locking body 103 are configured to locally unsheathe the closure element 102, bringing the electrically conductive path 120 into electric contact with both terminals 117,118. To form the locking body 103, the RFID inlay 104 and locking core 112 may be encased in a dielectric material, such as, for instance a thermosetting or thermoplastic polymer material.

A method of using the secure sealing device 101 to securely seal a container will now be described with reference to FIG. 1. In use, the elongated, flexible closure member 102 can be threaded and looped around two adjacent elements closing an access to a content to be sealed, such as, for instance, hasps attached to respective wings of a door of a shipping container. In a first step, the secure sealing device 101 is closed by inserting both ends 102a, 102b of the closure element 102 through the corresponding openings 115 into the locking body 103, where they are locked by the holding mechanisms within the locking core 112, irreversibly connecting both ends 102a, 102b of the closure element 102 to the locking body 103, and preventing the separation of the abovementioned two adjacent elements, so that access to the sealed content is effectively prevented unless the closure element 102 is broken.

While both ends 102a, 102b of the closure element 102 are locked in place, the sharp edges transverse to the channels 111 partially unsheathe the filaments forming the electrically conductive path 120 at both ends 102a, 102b so as to connect the two electric terminals 117, 118 through this electrically conductive path 120. Once the electric contacts are made, the electric circuit is closed between the two electric terminals 117, 118. If the closure element 102 is cut or pulled by force from the locking body, the RFID integrated circuit 105 will detect this seal breach as an interruption of the connection between the terminals 117, 118. If the RFID integrated circuit 105 is an active circuit with a rewriteable memory, it may even register this event, so as to reveal the breach even if the terminals 117, 118 are subsequently reconnected. The RFID integrated circuit 105 and antennas 106, 107 can be configured so as to communicate with readers at several meters' distance, further enhanced by the inductive coupling between the antennas 106, 107 and the conductive path 120. This allows, for instance, rapid wireless inspection of the seals of shipping containers and trucks by driving them through reader portals. During this inspection, the RFID integrated circuit 105 may transmit, upon being queried by the reader, data stored in its memory to identify the container, its cargo and/or itinerary, but even whether the connection between the terminals 117, 118 has been interrupted at any moment after it was closed, and therefore whether the secure sealing device 101 has been breached. Additionally, the secure sealing device 101 may even comprise a timing and/or positioning device connected to the RFID integrated circuit 105 so as to register not just whether a breach occurred but even when and/or where it occurred. These data may also be transmitted to the reader.

Even if the RFID integrated circuit 105 is a passive circuit and/or only has a read-only memory, tampering can be prevented by the design of the secure sealing device 101. Because of the shape and construction of the closure element 102, it will be very difficult to reconnect two segments of this closure element 102 after cutting between them, and even more difficult to disguise such a reconnection. If one or both ends 102a, 102b is pulled by force from the locking body 103, the sharp edges having locally unsheathed the conductive path 120 will hold back a whole segment of the sheath 121 within the locking body 103, and subsequently block the reintroduction of that end of the closure element 102. Additionally, the holding mechanisms within the locking core 112 may abrade the sheath 121 as it is pulled through, leaving clear marks on the surface of the sheath 121.

Moreover, the broken conductive path 120 will not achieve the same inductive coupling with the antennas 106, 107 as an intact conductive path 120, leading to a significant reduction in range which may by itself be detected by the RFID reader. This may be done, for instance, by applying a "power sweep" technique, in which an external reader interrogates the radiofrequency transceiver of the secure sealing device 101 at a given range with a transmission power that is increased gradually or stepwise. If the reader already detects a reply by the radiofrequency transceiver of the secure sealing device 101 in response to an outgoing interrogation signal emitted with a still comparatively low transmission power, this will indicate that said conductive path 120 is still intact, increasing the range and sensitivity of the radiofrequency transceiver of the secure sealing device 101 by inductive coupling. On the other hand, if the reader has to increase the transmission power of the secure sealing device 101 above a predetermined threshold to prompt a detectable response by the secure sealing device 101, this may indicate that the conductive path 120 has been broken, and the secure sealing device 101 breached, prompting thus a close visual inspection of the secure sealing device 101 and/or of the sealed cargo.

Figure 4:
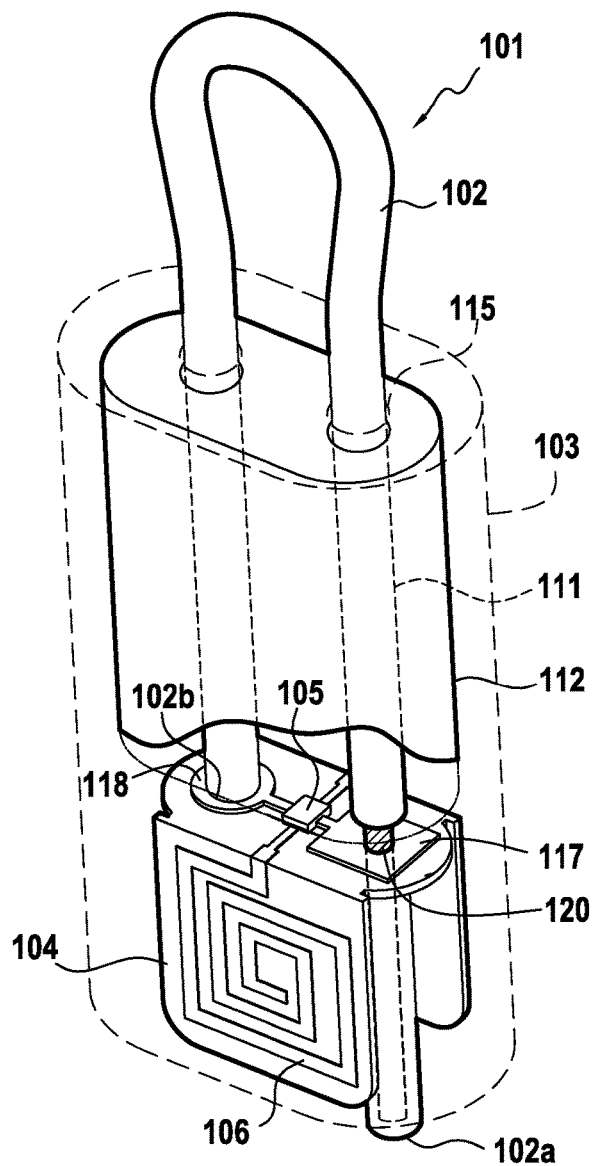
FIG. 4 is a cutaway perspective view of a secure sealing device according to a second embodiment of the present invention.
Figure 5:
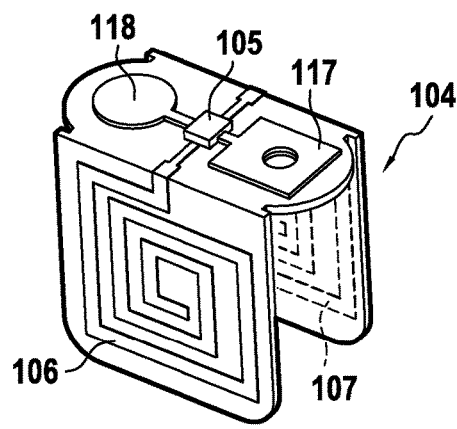
FIG. 5 is a perspective view of an RFID inlay of the secure sealing device of FIG. 4.

A second, alternative embodiment of a secure sealing device 101 is illustrated in FIGS. 4 and 5. The same reference numbers as for the components of the first embodiment are used for the analogous components of the second embodiment. This second embodiment differs from the first embodiment in that the second end 102b of the closure element 102 is solid with the locking body 103, with the electrically conductive path 120 fixedly connected to the second terminal 118. The locking core 112 thus only has a single holding mechanism, configured so as to hold the first end 102a of the closure element 102 when it is introduced in the channel 111 leading to the first terminal 117. In use, this secure sealing device 101 works analogously to that of the first embodiment. The same power sweep technique may be used to determine a breach of this secure sealing device 101.

A secure sealing device 101 according to a third embodiment of the present invention is illustrated in FIGS. 6 and 7. The same reference numbers as for the components of the first and second embodiment are used for the analogous components of this third embodiment. This secure sealing device 101 is similar to that of the first embodiment, except in particular in that the electrically conductive path 120 of the closure element 102 is not sheathed, but exposed instead. Furthermore, in this third embodiment, as illustrated on FIG. 7, the RFID inlay 104 does not present any electric terminals configured to contact this electrically conductive path 120, which instead contacts the metallic locking core 112 at both ends 102a, 102b of the closure element 102. Consequently, there isn't, in this embodiment, any provision for the active detection and storage of a breach of the secure sealing device 101 by the RFID integrated circuit 105. However, because the length of the conductive path 120 is substantially equal to X times half a working wavelength of the radiofrequency transceiver, wherein X is a whole number equal to or higher than one, the closed loop formed by the intact conductive path 120 and the metallic locking core 112 can significantly increase the range of the radiofrequency transceiver. The corresponding decrease in this range in case of a breach of the secure sealing device 101 breaking the conductive path 120 can be detected by an RFID reader during remote inspection of the secure sealing device 101 using the abovementioned power sweep technique, alerting to such tampering.

Figure 8A:
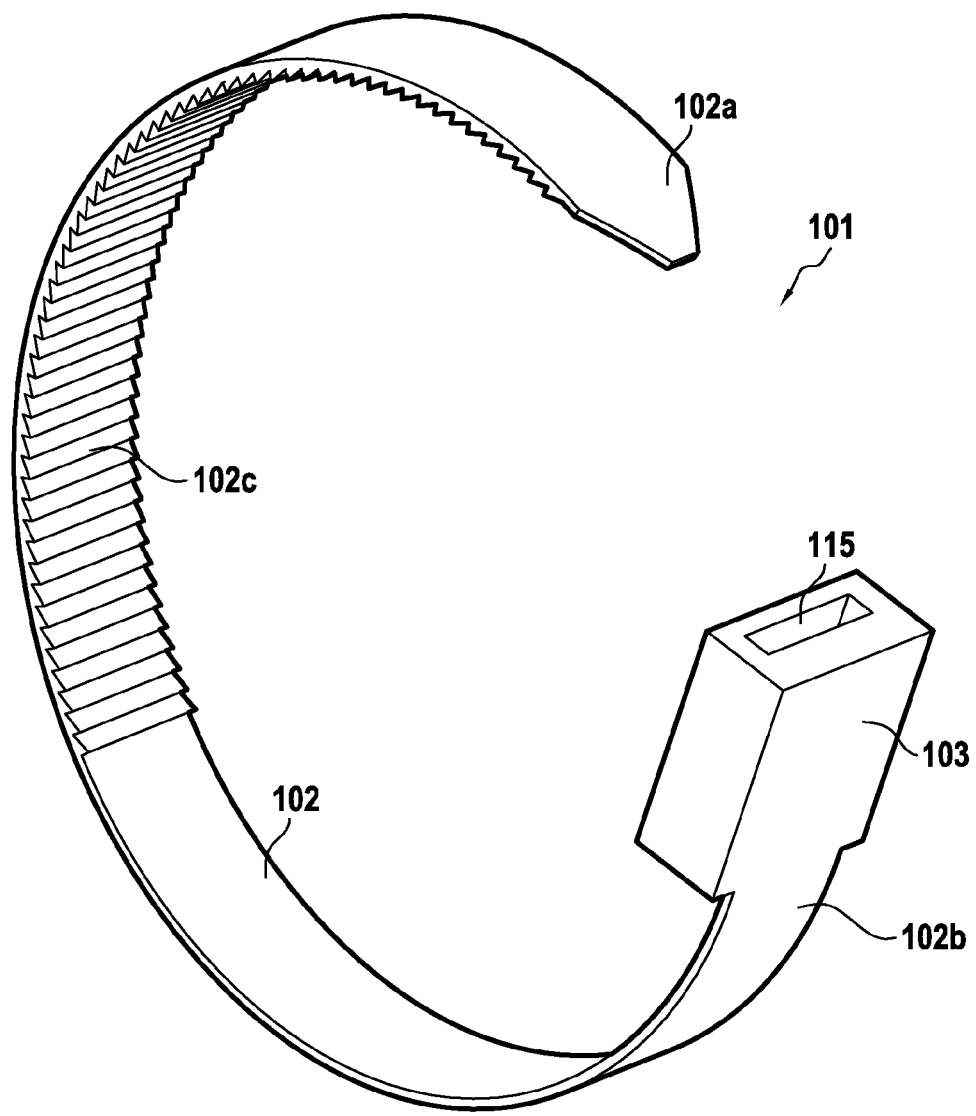
FIG. 8A is a perspective view of a secure sealing device according to a fourth embodiment of the present invention.

A secure sealing device 101 according to a fourth embodiment of the present invention is illustrated in FIGS. 8A, 8B and 9. As can be seen in FIG. 8A, this secure sealing device 101 comprises a closure element 102 in the form of a plastic ratchet strap, and a locking body 103 integrally formed with the closure element 102. A first end 102a of this closure element 102a is free, whereas a second end 102b is fixedly connected to the locking body 103. The locking body 103 presents an opening 115 for receiving the first end 102a of the closure element 102 to close the secure sealing device

101. Within the opening 115, a holding mechanism 116 is shaped so as to allow the introduction of the closure element 102 through the opening 115 in one direction, but cooperate with the ratchet teeth 102c to prevent its subsequent retreat in the opposite direction. This holding mechanism can be reinforced to ensure that, under a pulling force, the closure element 102 will break before the irreversible connection between the lock body 103 and the first end 102a of the closure element 102. In the illustrated embodiment, the lock body 103 forms a tag which can present visible markings (not shown), in the form, for instance, of alphanumeric codes, bar codes, or other human- or machine-readable codes, printed or embossed, or of other authentication or identification markings, such as, for instance, holograms.

As illustrated in the cutaway view of FIG. 8B, the secure sealing device 101 also comprises, embedded within the locking body 103, an RFID inlay 104 carrying an electric circuit comprising a data carrier, a transceiver, and first and second antennas 106,107 for the transceiver. In this fourth embodiment, the data carrier and transceiver are also integrated in a RFID integrated circuit 105, compliant with ISO/IEC 18000. The working frequencies of this RFID integrated circuit 105 may also be, for instance, 2.45 GHz, as specified under ISO/IEC 18000-4, 860-960 MHz, as specified under ISO/IEC 18000-6, and/or 433 MHz, as specified under ISO/IEC 18000-7. In particular, in this fourth embodiment, the RFID integrated circuit may be configured so as to use a plurality of different frequencies. As in the other embodiments, the data carrier can be a read-only or a rewritable memory, wherein a rewritable memory could store information received by the radiofrequency transceiver, such as, for instance, itinerary information collected at each reading of the radiofrequency transceiver. The substrate of the RFID inlay 104 is also n-shaped, and the antennas 106,107 formed on two lateral segments 104b, 104c oriented following two parallel planes, each at a straight angle to the plane of the intermediate segment 104a.

The secure sealing device 101 also comprises a plurality of parallel conductive paths 120 of different lengths in the closure element 102, printed on a non-conductive substrate of the secure sealing device 101. This non-conductive substrate can be produced, for instance, in a first injection molding step, and the RFID inlay 104 and plurality of parallel conductive paths 120 can be safely encapsulated in a subsequent second injection molding step. The length of each conductive path 120 can be substantially equal to one or several times half a working wavelength of the radiofrequency transceiver. For instance, if the radiofrequency transceiver has a first working frequency in the 860-960 MHz band, and a second working frequency around 433 MHz, which correspond, respectively, to a first wavelength of approximately 0.35 m and a second wavelength of 122 mm, the length of a first conductive path 120 can be substantially equal to X times 175 mm, and that of a second conductive path 120 substantially equal to Y times 61 mm, wherein both X and Y are whole numbers equal or higher than one. With such lengths, when receiving or transmitting signals at one of these working frequencies, there is inductive coupling between the planar antennas 106, 107 and the corresponding electrically conductive path 120, enhancing the range of the radiofrequency transceiver.

In use, the elongated, flexible closure member 102 can be threaded and looped around two adjacent elements closing an access to a content to be sealed, such as, for instance, hasps attached to respective wings of a door of a shipping container. The second end 102b of the closure member 102 is then threaded through the opening 115, irreversibly connecting it to the locking body 103, and preventing the separation of the abovementioned two adjacent elements, so that access to the sealed content is effectively prevented unless the closure member 102 is broken.

If the closure member 102 is broken, the conductive paths 120 are also broken, and the range of the radiofrequency transceiver decreased, as in the third embodiment. It must be noted that, because the electrically conductive path 120 is embedded within the closure member 102, it will normally not be possible to reliably re-establish this electrically conductive path 120 by repairing the broken closure member 102.

If the radiofrequency transceiver 105 is interrogated by a remote reader, the range at which it will be able to respond to an interrogation signal at a given transmission power will thus depend on the state of the closure member 102. The abovementioned power sweep technique may thus be used to determine whether a closer inspection of the secure sealing device 101 is appropriate. The visible markings in the locking body 103 can then complement the information provided by the radiofrequency transceiver 105.

Figure 10A:
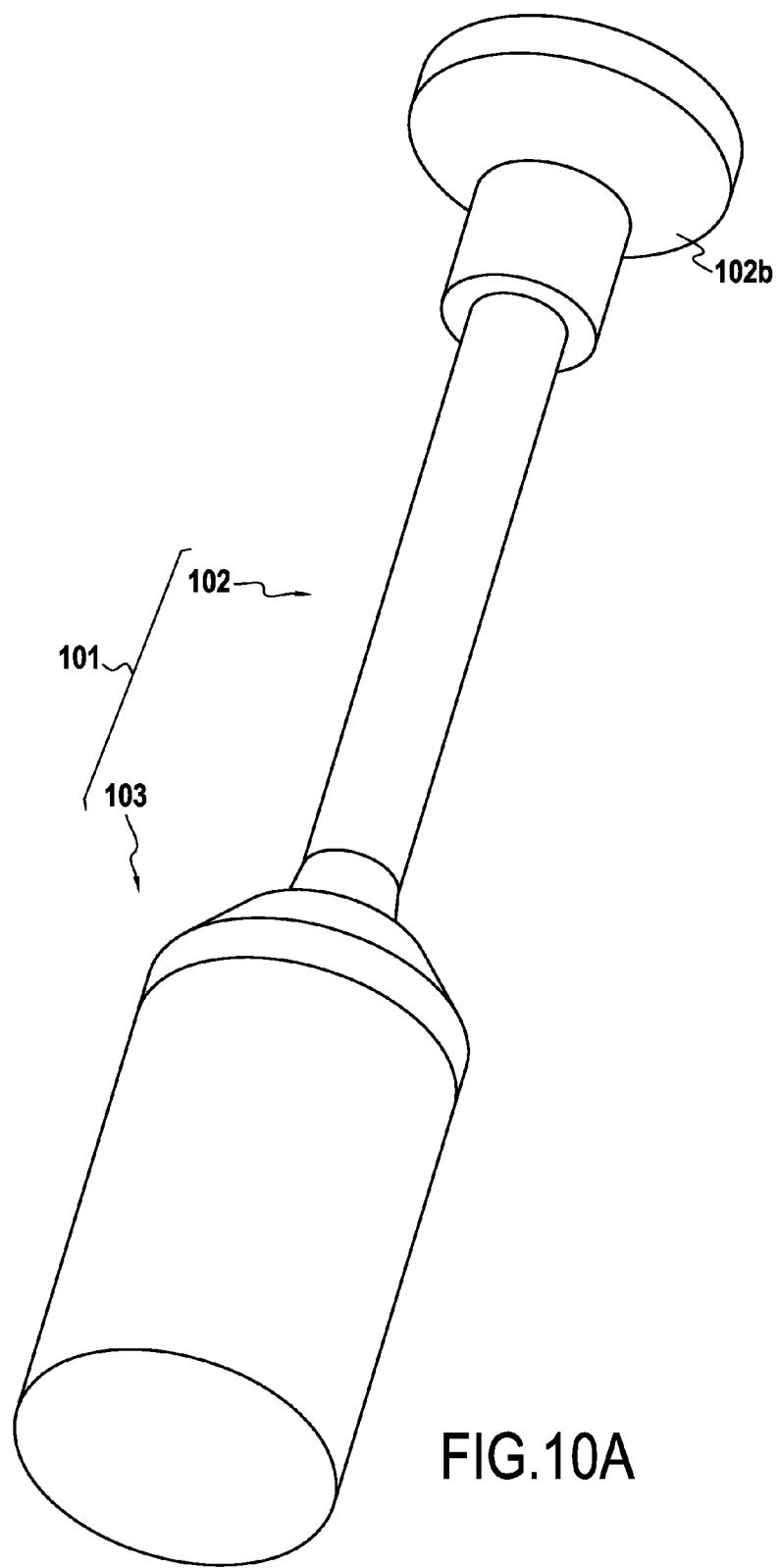
FIG. 10A is a perspective view of a secure sealing device according to a fifth embodiment of the present invention.

The same principles can also be applied to a secure sealing device of a different type, namely a seal-bolt-type secure sealing device 101 as illustrated on FIGS. 10A and 10B. In this fifth embodiment, the closure member 102 takes the form of a locking pin with a first free end 102a, a second free end 102b, and a metal core forming an electrically conductive path 120. This electrically conductive path 120 is exposed at least at said first free end 102a, which presents a tapered edge 130 and an annular groove 131 on its outer perimeter, but an electrically insulating sheath 121 may at least partially cover the rest of the electrically conductive path 120. As illustrated in both figures, the closure element 102 has a round cross-section, although other cross-sections, for example polygonal cross-sections, can alternatively be considered. Its second free end 102b presents an enlarged cross-section.

In this fifth embodiment, the locking body 103 comprises a tubular locking core 112 with a channel 111, closed at one end by an end cap 132, and open at the other end for insertion of the first free end 102a of the closure element 102. The end cap 132 presents a blind hole 136 opening into said channel 111. A snap ring 133, held within the locking core 112 of the locking body 103, between said end cap 132 and a metal ring 134, forms a holding mechanism for locking said first free end 102a of the closure member 102, following its insertion into channel 111, by snapping into the annular groove 131 around the first free end 102a of the closure element 102.

As illustrated in the exploded view of FIG. 10B, the secure sealing device 101 also comprises, embedded within the locking body 103 and wrapped around its locking core 112, a flexible RFID inlay 104 carrying an electric circuit comprising a data carrier, a transceiver, an antenna 106 for the transceiver, and first and second electric terminals 117, 118. This flexible RFID 104 is illustrated, flat and in more detail, in FIG. 11. In this fifth embodiment, the data carrier and transceiver are also integrated in a RFID integrated circuit 105, compliant with ISO/IEC 18000. The working frequencies of this RFID integrated circuit 105 may also be, for instance, 2.45 GHz, as specified under ISO/IEC 18000-4, 860-960 MHz, as specified under ISO/IEC 18000-6, and/or 433 MHz, as specified under ISO/IEC 18000-7. As in the other embodiments, the data carrier can be a read-only or a rewritable memory, wherein a rewritable memory could store information received by the radiofrequency transceiver, such as, for instance, itinerary information collected at each reading of the radiofrequency transceiver. Each one of the first and second electric terminals 117, 118 is directly connected to the RFID integrated circuit 105 over a conductive path printed onto the flexible substrate of the RFID inlay 104. The RFID inlay 104 is wrapped around the locking core 112, wherein the conductive paths leading to the first and second electric terminals 117,118 reach between the end cap 132 and the locking core 112 and into the blind hole 136 of the end cap 132, so that the first free end 102a of the closure element 102, when locked into the channel 111, contacts both these first and second electric terminals 117,118, establishing an electric connection between them.

The RFID integrated circuit 105 in this embodiment may also be passive, that is, powered only by the energy of incoming radiofrequency signals, or it may be connected to a power source, such as a battery or capacitor, possibly contained within the secure sealing device 101. This RFID integrated circuit 105 is also configured so as to detect an electric connection between the two electric terminals 117, 118. If the RFID integrated circuit 105 has a rewritable memory and remains connected to a power source, it may also be configured to register, in the rewritable memory, the event of such an electric connection between the terminals 117, 118 and/or its interruption.

The antenna 106 is a planar antenna formed also by a conductive path printed onto the flexible substrate of the RFID inlay 104, and comprises a first meandering segment 106a, and a second segment 106b formed as a single, broader electrically conductive strip, shaped so as to form a ring around the metal ring 134 within the locking core 112 when the RFID inlay 104 is wrapped around the locking core 112. This increases the inductive coupling between the antenna 106, the metal ring 134, and the electrically conductive path 120 within the closure member 102 when the first free end 102a of the closure member 102 is locked within the channel 111, enhancing the range of the radiofrequency transceiver. As in the previous embodiments, the length of this conductive path 120 can be substantially equal to X times half a working wavelength of the radiofrequency transceiver, wherein X is a whole number equal to or higher than one, so as to enhance the range of the radiofrequency transceiver by inductive coupling. However, when testing this particular embodiment, it has also been found that a shorter length, namely a length of $½^X$ times the working wavelength of the radiofrequency transceiver, is also conducive to inductive coupling leading to a marked improvement in the range of the radiofrequency transceiver. So, for instance, if the working frequency of the radiofrequency transceiver is in the 860-960 MHz band, which corresponds to a wavelength of approximately 0.35 m, the length of the conductive path 120 can be substantially equal to 87.5 mm, that is, one-half half said wavelength, or even 43.75 mm, that is, one-quarter half said wavelength, and show a marked improvement in the range of the radiofrequency transceiver. Such fractional lengths are also potentially applicable to the previous embodiments.

Finally, an outer shell 135 of a dielectric material, such as for instance a thermosetting or thermoplastic polymer material, surrounds the RFID inlay 104 and the locking core 112, leaving just an opening 115 into the channel 111. For visual identification of the secure sealing device 101, the locking body 103 can present visible markings (not shown), in the form, for instance, of alphanumeric codes, bar codes, or other human- or machine-readable codes, printed or embossed, or of other authentication or identification markings, such as, for instance, holograms.

A method of using the secure sealing device 101 of this fifth embodiment to securely seal a container will now be described with reference to FIG. 10A. In use, the closure member 102 can be threaded through two adjacent elements closing an access to a content to be sealed, such as, for instance, hasps attached to respective wings of a door of a shipping container. In a first step, the secure sealing device 101 is closed by inserting the first free end 102a of the closure element 102, through the opening 115, into the locking body 103, where it is locked by the holding mechanism within the locking core 112, irreversibly connecting said first end 102a of the closure element 102 to the locking body 103, to prevent the separation of the abovementioned two adjacent elements, so that access to the sealed content is effectively prevented unless the closure element 102 is broken.

When the first end 102a of the closure element 102 is locked within channel 111, the exposed electrically conductive path 120 connects the two electric terminals 117, 118. Once the electric contacts are made, the electric circuit is closed between the two electric terminals 117, 118. If the closure element 102 is pulled by force from the locking body, the RFID integrated circuit 105 will detect this seal breach as an interruption of the connection between the terminals 117, 118. If the RFID integrated circuit 105 is an active circuit with a rewriteable memory, it may even register this event, so as to reveal the breach even if the terminals 117, 118 are subsequently reconnected. The RFID integrated circuit 105 and antenna 106 can be configured so as to communicate with readers at several meters' distance, further enhanced by the inductive coupling between the antenna 106, the metal ring 134, and the conductive path 120. The remote inspection of the seals can therefore proceed in an analogous manner as for the previous embodiments. The abovementioned power sweep technique can also be used for this fifth embodiment.

Those skilled in the art will recognize that the present invention may be manifested in a variety of forms other than the specific embodiments described and contemplated herein. In particular, other embodiments may combine individual features of the five embodiments disclosed. Accordingly, departure in form and detail may be made without departing from the scope of the present invention as described in the appended claims.

The invention claimed is:
1. A secure sealing device comprising:
  a closure element with at least one electrically conductive path; and
  a locking body comprising an electric circuit with a data carrier and a radiofrequency transceiver with a predetermined working wavelength, said locking body being configured to be locked to at least one free end of said closure element to attach the locking body to an object to be sealed, wherein said locking body is configured to lock together a first and a second end of said closure element to attach the locking body to the object to be sealed; and wherein said at least one electrically conductive path of the closure element has a length which is substantially equal to X or $½^X$ times half said predetermined working wavelength of the radiofrequency transceiver, wherein X is a whole number equal to or higher than one.
2. The secure sealing device according to claim 1, wherein said electric circuit further comprises at least a first planar antenna oriented in a first plane and connected to said radiofrequency transceiver, and wherein said locking body is configured to lock together said first and second ends of the closure element oriented in a plane substantially parallel to said first plane.

3. The secure sealing device according to claim 2, wherein said electric circuit further comprises at least a second planar antenna oriented substantially parallel to the first planar antenna.

4. The secure sealing device according to claim 1, wherein said electric circuit comprises first and second electric terminals configured to be connected through the at least one electrically conductive path of the closure element when the first and second ends of the closure element are locked together by the locking body.

5. The secure sealing device according to claim 4, wherein the electric circuit is configured to automatically store within said data carrier an indication of whether a connection between said first and second electric terminals has been interrupted.

6. The secure sealing device according to claim 4, wherein the electric circuit is formed onto a substrate comprising at least a first segment, incorporating at least a first planar antenna of the radiofrequency transceiver, extending in a first plane, and a second segment, supporting at least said first and second electric terminals and extending in a second plane at an angle.

7. The secure sealing device according to claim 6, wherein said substrate further includes a third segment, supporting at least a second planar antenna of the radiofrequency transceiver, and extending substantially parallel to the first segment.

8. The secure sealing device according to claim 1, wherein said electric circuit is encased within a dielectric material.

9. The secure sealing device according to claim 1, wherein said locking body comprises at least a first opening for insertion of a first free end of said closure element into said locking body, and a first holding mechanism for preventing removal of said first free end from said first opening once inserted.

10. The secure sealing device according to claim 9, wherein said locking body comprises a second opening for insertion of a second free end of said closure element into said locking body, and a second holding mechanism for preventing removal of said second free end from said second opening once inserted.

11. The secure sealing device according to claim 9, wherein the second end of said closure element is solid with said locking body.

12. The secure sealing device according to claim 1, wherein the closure element is flexible.

13. The secure sealing device according to claim 1, wherein said radiofrequency transceiver has a plurality of predetermined working wavelengths, and said closure element has a plurality of electrically conductive paths of different lengths, each electrically conductive path substantially equal to a multiple of one half of one of said plurality of predetermined working wavelengths of the radiofrequency transceiver.

14. A method for checking a secure sealing device according to claim 1, wherein an external reader, located at a predetermined range from said radiofrequency transceiver, sends an interrogation signal addressed to the radiofrequency transceiver and using said predetermined working wavelength, at various different transmission power levels, and issues an alert if the external reader fails to receive a response from the radiofrequency transceiver or receives a response from the radiofrequency transceiver when a transmission power level of the interrogation signal is above a predetermined transmission power threshold.

15. The secure sealing device according to claim 6, wherein the angle is a substantially straight angle with respect to the first plane.

* * * * *